US010003982B2

(12) United States Patent
Chang et al.

(10) Patent No.: US 10,003,982 B2
(45) Date of Patent: Jun. 19, 2018

(54) METHOD AND APPARATUS FOR TELEMETRY SYSTEM DATA RATE OPTIMIZATION

(71) Applicant: The Boeing Company, Chicago, IL (US)

(72) Inventors: Chen J. Chang, Madison, AL (US); Amir L. Liaghati, Huntsville, AL (US); Mahsa L. Liaghati, Madison, AL (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 15/091,695

(22) Filed: Apr. 6, 2016

(65) Prior Publication Data

US 2017/0099606 A1   Apr. 6, 2017

Related U.S. Application Data

(60) Provisional application No. 62/237,621, filed on Oct. 6, 2015.

(51) Int. Cl.
*H04W 24/02* (2009.01)
*H04W 28/14* (2009.01)
(Continued)

(52) U.S. Cl.
CPC ........ *H04W 24/02* (2013.01); *H04B 7/18506* (2013.01); *H04L 61/2592* (2013.01); *H04W 28/14* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 5,982,761 A | * | 11/1999 | Dutta | H04B 7/18532 370/337 |
| 2003/0132878 A1 | * | 7/2003 | Devereux | G01C 21/00 342/357.29 |

(Continued)

OTHER PUBLICATIONS

Lonsdorfer, et al. "High Speed CCSDS Data Formatter"; Proceedings of DASIA 2003 (ESA SP-532). Jun. 2-6, 2003, Prague, Czech Republic. Editor: R.A. Harris. Published on CDROM., id.35.1.

(Continued)

*Primary Examiner* — Mohammad Adhami
(74) *Attorney, Agent, or Firm* — Perman & Green, LLP

(57) ABSTRACT

A method for transmitting data, the method including receiving data from one or more data units, determining a total data rate based on data obtained from the one or more data units, determining an optimum data rate for packet transmission based on minimizing overhead data included in the packet transmission where, when the total data rate exceeds a predetermined threshold, a first portion of data is automatically removed from the data obtained from the one or more data units for placement in a data storage buffer and a second portion of the data obtained from the one or more data units remains in the packet transmission such that the total data rate is decreased and transmitting the second portion of the data obtained from the one or more data units at the optimum data rate.

20 Claims, 11 Drawing Sheets

(51) Int. Cl.
*H04L 29/12* (2006.01)
*H04B 7/185* (2006.01)
*H04W 72/04* (2009.01)

(56) References Cited

U.S. PATENT DOCUMENTS

| | | | |
|---|---|---|---|
| 2004/0127158 A1* | 7/2004 | Dai | H04B 7/18513 |
| | | | 455/12.1 |
| 2009/0213916 A1* | 8/2009 | Liu | H04L 12/2898 |
| | | | 375/220 |
| 2012/0051273 A1* | 3/2012 | Febvre | H04L 1/0045 |
| | | | 370/310 |
| 2013/0124730 A1* | 5/2013 | Buerk | H04L 67/14 |
| | | | 709/225 |
| 2014/0169487 A1* | 6/2014 | Liu | H04W 52/325 |
| | | | 375/260 |
| 2016/0007295 A1* | 1/2016 | Kahn | H04W 52/0251 |
| | | | 370/311 |

OTHER PUBLICATIONS

CCSDS; "Recommendation for Space Data System Standards; AOS Space Data Link Protocol" Recommended Standard CCSDS 732.0-B-2; Blue Book, Issue 2, Jul. 2006; Published by CCSDS Secretariat, Office of Space Communication (Code M-3), NASA, Washington, DC.

Epperly, et al. "Mission Adaptable CCSDS Formatter/Command Decoder," Core Technologies for Space Systems Conference, Colorado Springs, Colorado, Nov. 1999.

CCSDS; "Recommendation for Space Data System Standards; TM Synchronization and Channel Coding" Recommended Standard CSDS 131.0-B-1, Blue Book, Issue 1, Sep. 2003; Published by CCSDS Secretariat, Office of Space Communication (Code M-3), NASA, Washington, DC.

CCSDS; "Recommendation for Space Data System Standards; Encapsulation Service" Recommended Standard CCSDS 133.1-B-2, Blue Book, Issue 2, Oct. 2009; Published by CCSDS Secretariat, Space Communications and Navigation Office 7L70, Space Operations Missions Directorate, NASA, Washington, DC.

* cited by examiner

METHOD AND APPARATUS FOR TELEMETRY SYSTEM DATA RATE OPTIMIZATION

CROSS-REFERENCE TO RELATED APPLICATION

This application claims the benefit of and is a non-provisional of U.S. Provisional Patent Application Ser. No. 62/237,621, filed Oct. 6, 2015, the disclosure of which is hereby incorporated by reference in its entirety.

BACKGROUND

Generally, in the field of telecommunications, communication transmissions are facilitated by the use of communication platforms (e.g. relay stations). These communication platforms include any vehicle, manned or unmanned, that passes over, or hovers over a territorial coverage region, ranging from typical altitudes of manned and unmanned aircraft (UAVs) and lighter than air (LTA) platforms, to communication satellites in any orbit, not just of the Earth but of any celestial object such as the Moon or Mars.

Generally, these communication platforms have limited downlink telemetry bandwidth due to, for example, restricted radio frequency spectrum allocation. A large percentage of the allotted bandwidth for the communication platforms is consumed by overhead required by each communication data packet to follow various standards and layer protocols used in the telemetry system. This limited telemetry bandwidth and the required overhead results in inefficiencies in the actual telemetry data downlinked to, for example, a ground station. In conventional communication system designs, generally only one virtual channel is used per packet. As a result, in order to achieve the required packet size, fill data is inserted into the remaining bits. This fill data, generally consists of a set pattern of binary digits, and is considered part of the overhead, as its sole purpose is to fill the packet.

As a general example, many NASA (National Aeronautics and Space Administration) space programs use Consultative Committee for Space Data Systems (CCSDS) standards as the layer 2 protocols for the downlink telemetry data to the ground station. The CCSDS standards use a fixed size, packetized telemetry protocol scheme. However, as noted above, the CCSDS protocol consumes a large amount of overhead in the header information. Depending on the downlink transmission rate, a size of the Channel Access Data Unit (CADU) frame, and if there is any forward error correction required in order to maintain the link margin to the ground station, the typical CCSDS overhead consumed is between about 14% to about 50% in a CADU. Part of the inefficiency of the CCSDS formatted telemetry is due to, for example, the filled data used at the end of each Advanced Orbiting Systems (AOS) Transfer Frame in order to keep the fixed size packet. The size of the filled data is determined by the size of the actual payload. The filled data can be predicted if the raw data is a fixed size packet.

Most space communication applications have limited telemetry bandwidth due the spectrum allocation as noted above. A telemetry processing box for the space application receives flight instrumentation data from, for example, a computer or other data acquisition boxes, and packages the received data to the CCSDS format telemetry and downlinks it to the ground station in real time. The telemetry processing box is generally designed for short duration mission where the data is received and transmitted at the same time. A disadvantage of this conventional design is that the unsubscribed telemetry data will be consumed by the filled data in order to maintain the fixed size CADU packet.

Typically, CCSDS 133.1-B-2 is the encapsulation service that is used with conventional space data protocol service. As part of the CCSDS encapsulation service, each received completed payload frame has an encapsulation packet header inserted at the beginning of the payload. When the data field is less than the expected number of bytes of a CCSDS packet, one (or multiple of 1 byte) CCSDS packet(s) will be inserted into the data field to maintain the fixed size AOS transfer frame. Once the encapsulation service is complete, the encapsulated packet is then transferred using the AOS space data link protocol, such as specified in CCSDS 732.0-B-2, in a constant length AOS transfer frame. Generally, each type of telemetry is appended by a different virtual channel including header information, which the ground station receiver uses for differentiating telemetry types. The start of the AOS transfer frame is signaled by an underlying channel coding sub-layer which is specified by CCSDS 131.0-B-2. This start pattern is called the ASM sync marker. When for, example, a virtual channel ID is equal to a predetermined value, idle transfer frames are being transmitted. The idle transfer frames do not include user data in the transfer frame data field and the idle data or idle pattern in the transfer frame data field must not be confused with the idle packet specified as part of CCSDS 133.1-B-2.

Multiplexing Protocol Data Unit (M_PDU) or idle data is part of the transfer frame data field. The M_PDU is a 2 byte header where the first 5 bits are spare bits and a first header pointer is 11 bits. The first header pointer shall contain the position of the first byte of the encapsulation packet that starts in the M_PDU packet zone. The first byte of data in the M_PDU packet zone is assigned location 0. If no packet starts in the M_PDU packet zone then the first header pointer shall be set to all 1's (11'h7FF). This situation occurs when a long packet spans across multiple AOS transfer frames. In the case where no valid transfer frame data field is available for transmission at release time for an AOS transfer frame, an AOS transfer frame with a data field containing only idle data shall be transmitted. The VICD shall be set to all 1's and the project=specified idle patted is to be inserted. The first header pointer in this is then set to all 1's minus 1 (11'h7FE).

Upon completion of the AOS transfer frame, the telemetry box will append 1022 bits of a low-density parity-check code rate of 223/225 techniques in accordance with CCSDS 131.0-B-2, section 7.3, and there are two additional 0 filled bits added after the 1022 low-density parity-check code bits in order to form, for example, a 8160 bit codeword. The last step involved in CCSDS 131.0-B-2 attached a sync marker and pseudo-randomizes bits in the 8160 bit codeword to ensure sufficient bit transition density. This pseudo-randomization is accomplished by XOR each bit of the codeword with the output of a standard pseudo-random sequence. The pseudo-random sequence shall be generated using $h(x)=x^8+x^7+x^5+x^3+1$. This sequence continues for 255 cycles and repeats until end of the codeword. Note that the ASM sync marker is not randomized.

Accordingly, apparatus and method, intended to address the above-identified concerns, would find utility.

SUMMARY

A method for transmitting data, the method including receiving data from one or more data units, determining a total data rate based on data obtained from the one or more data units, determining an optimum data rate for packet transmission based on minimizing overhead data included in the packet transmission where, when the total data rate exceeds a predetermined threshold, a first portion of data is automatically removed from the data obtained from the one or more data units for placement in a data storage buffer and a second portion of the data obtained from the one or more data units remains in the packet transmission such that the total data rate is decreased and transmitting the second portion of the data obtained from the one or more data units at the optimum data rate.

A communication apparatus including one or more data units and a telemetry unit connected to the one or more data units, the telemetry unit including a processor and a storage buffer, the processor being configured to determine a total data rate based on data obtained from the one or more data units, determine an optimum data rate for packet transmission based on minimizing overhead data included in the packet transmission where, when the total data rate exceeds a predetermined threshold, a first portion of data is automatically removed, by the processor, from the data obtained from the one or more data units for placement in the storage buffer and a second portion of the data obtained from the one or more data units remains in the packet transmission such that the total data rate is decreased, and transmit the second portion of the data obtained from the one or more data units at the optimum data rate.

A telemetry system including a storage buffer, one or more data units, and a processor connected to the storage buffer and the one or more data units, the processor being configured to determine a total data rate based on data obtained from the one or more data units, determine an optimum data rate for packet transmission, including flight control data and mission decision data, based on minimizing overhead data included in the packet transmission where, when the total data rate exceeds a predetermined threshold, a first portion of data is automatically removed, by the processor, from the data obtained from the one or more data units for placement in the storage buffer and a second portion of the data that includes the flight control data and the mission control data, obtained from the one or more data units, remains in the packet transmission such that the total data rate is decreased, and transmit the second portion of the data obtained from the one or more data units at the optimum data rate.

BRIEF DESCRIPTION OF THE DRAWINGS

Reference will now be made to the accompanying drawings, which are not necessarily drawn to scale, and wherein like reference characters designate the same or similar parts throughout the several views, and wherein.

Figure 1:
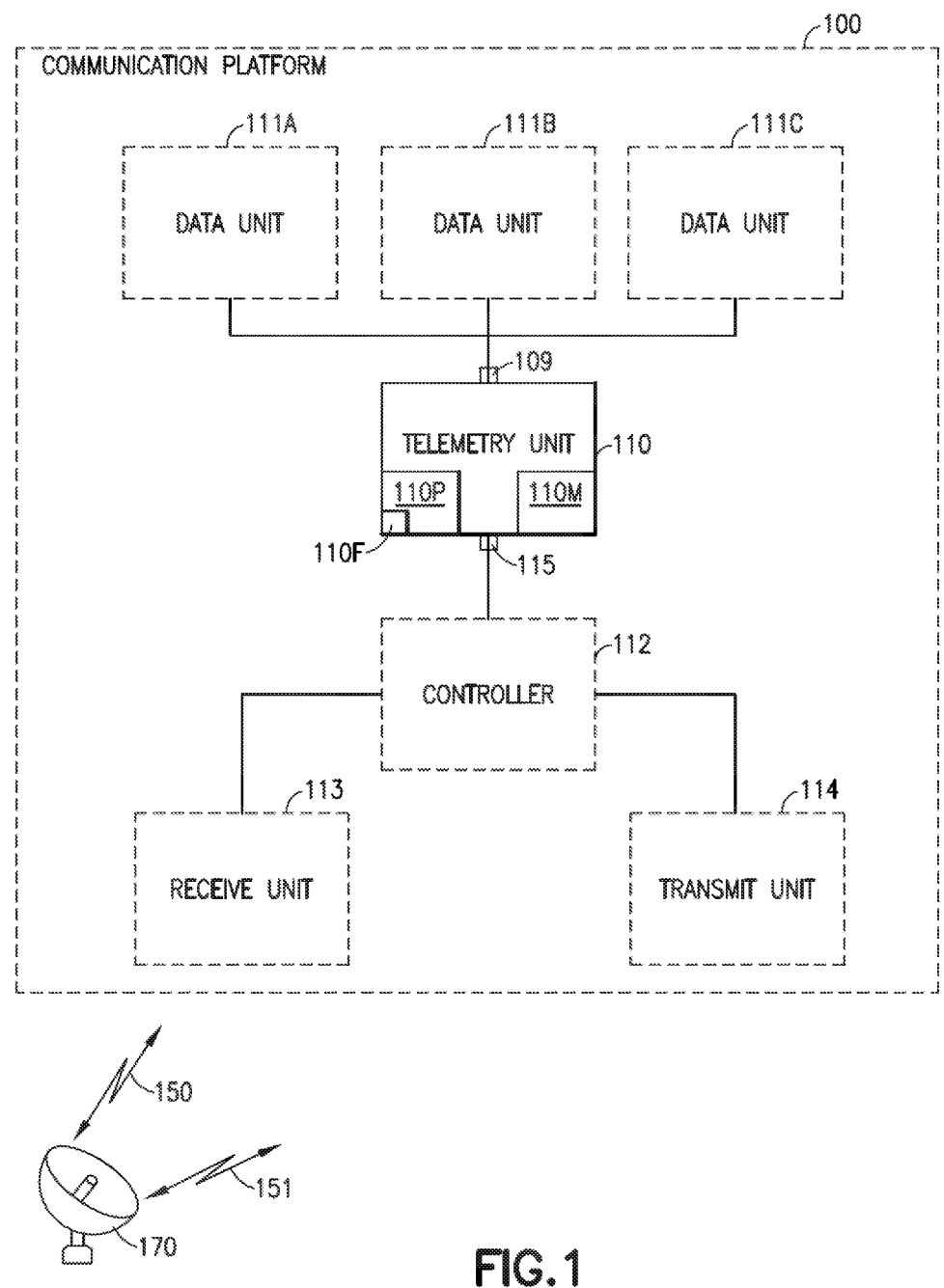
FIG. 1 is a block diagram of a communications platform incorporating aspects of the present disclosure.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. More-over, reference to, e.g., a "second" item does not require or preclude the existence of, e.g., a "first" or lower-numbered item, and/or, e.g., a "third" or higher-numbered item.

The aspects of the present disclosure provided an apparatus and method that takes advantage of the empty bits in a transfer frame, such as an advanced orbiting system transfer frame, by starting the next virtual channel instead of inserting fill bits as is done in the conventional systems. The apparatus and method of the present disclosure incorporating the data transfer scheme reduce the overall amount of overhead in the transfer frame due to fill data while allowing more telemetry data to be transmitted. The aspects of the present disclosure improve the overall downlink telemetry performance of a communication platform 100 by reducing the percentage of CCSDS overhead due to filled data with an autonomous detection method.

While, in one aspect of the present disclosure, a communication platform or system 100 is described as part of a satellite architecture (and is referred to herein as communication platform 100), it is understood that, in other aspects, the communication system 100 can be part of any aerial or orbital communications platform, for example, a long-term unmanned aerial vehicle or a lighter-than-air dirigible vehicle. Referring to FIG. 1, in the aspects of the present disclosure the communication platform 100 includes, a controller 112, a receive unit 113, a transmit unit 114, a telemetry unit 110, and one or more data units 111A-111C. The controller 112 is connected to the receive unit 113 and transmit unit 114 to effect receiving data signals 150 from a ground station 170 with the receive unit and to effect sending data signals 151 to the ground station 170 with the transmit unit 114. The one or more data units 111A-111C of the communication platform 100 are configured to gather data concerning the communication platform 100. For example, in one aspect, the one or more data units 111A-111C data acquisition modules for the various systems of the communication platform 100 such as flight control systems, sensor systems, etc. The one or more data units 111A-111C are configured to acquire flight instrumentation data, sensor data and/or any other data suitable for the control and operation of the communication platform 100. Each data unit 111A-111C is communicably coupled to one or more inputs 109 of the telemetry unit 110. In other aspects, the one or more data units 111A-111C may also be connected to the controller 112 for receiving command information from the controller 112.

Figure 2:
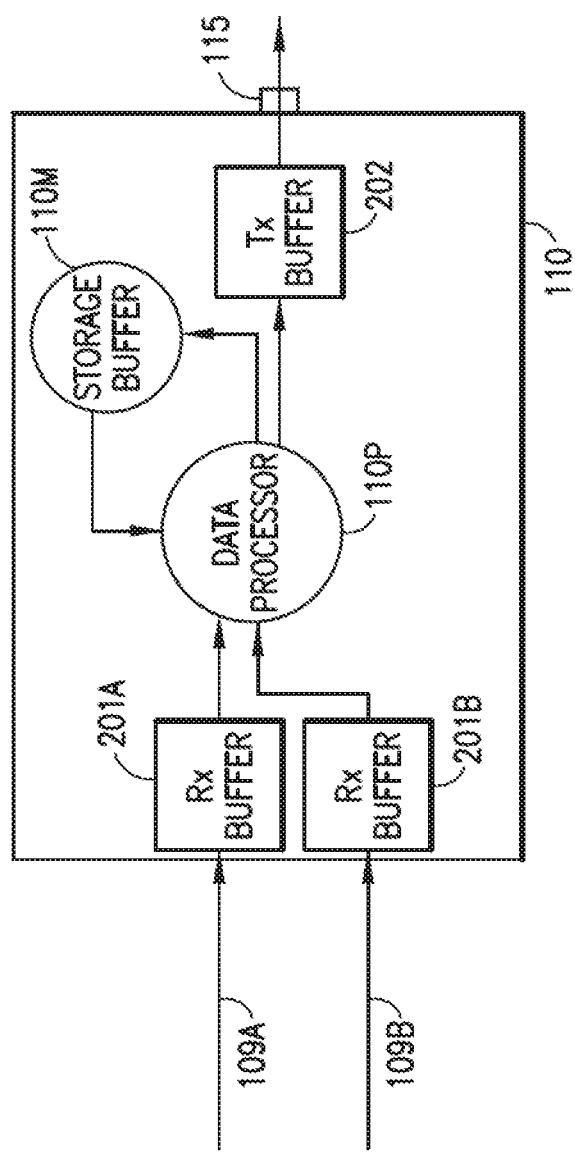
FIG. 2 is a schematic illustration of a telemetry unit of the communications platform according to aspects of the present disclosure.

Referring to FIGS. 1 and 2, in one aspect of the present disclosure the telemetry unit 110 is connected to the controller 112 through an output 115 of the telemetry unit 110. As described herein, the telemetry unit 110 forms the transfer frames which are communicated by the telemetry unit 110, through the controller 112, to the transmit unit 114 for inclusion in a downlink signal 151 to the ground station 151. The telemetry unit 110 includes a memory or storage buffer 110M and a processor 110P which are communicably coupled to each other. In one aspect, the storage buffer 110M is configured to store at least excessive telemetry data received from the one or more data units 111A-111C, for later playback (e.g. retrieved from memory for inclusion in a downlink signal 151). In one aspect, the storage buffer 110M is configured to store non-critical telemetry data such as, for example, video data, developmental flight instrumentation data, etc. which data is not used for real time flight control or real time decision making in a mission performed by the communication platform 100. The types of telemetry data (as determined by, for example, a source of the telemetry data) is differentiated by different virtual channel assignments of a transfer frame. For example, each of the data units 111A-111C has a respective virtual channel within one or more transfer frames as described herein. The processor 110P includes any suitable programming for carrying out the aspects of the present disclosure as described herein. For example, the processor 110P includes hardware and software algorithms for autonomously detecting the current downlink data rate, determining an optimum data rate and playing back recorded data (e.g. inserting the stored data into a transfer frame in place of fill data) from the storage buffer 110M. The inputs 109A, 109B of the telemetry unit 110 are connected to respective receive buffers 201A, 201B which are configured to buffer data received from a respective one of the data units 110A-110C to the processor 110P. While two receive buffers 201A, 201B are illustrated for exemplary purposes in other aspects there is a corresponding receive buffer for each data unit 110A-110C. A transmit buffer 202 is connected to the processor 110P for transmitting the transfer frame, through the output 115, to the controller 112 for transmission to the transmit unit 114, while in other aspects, the transmit buffer 202 transmits the transfer frame substantially directly to the transmit unit 114.

Figure 3:
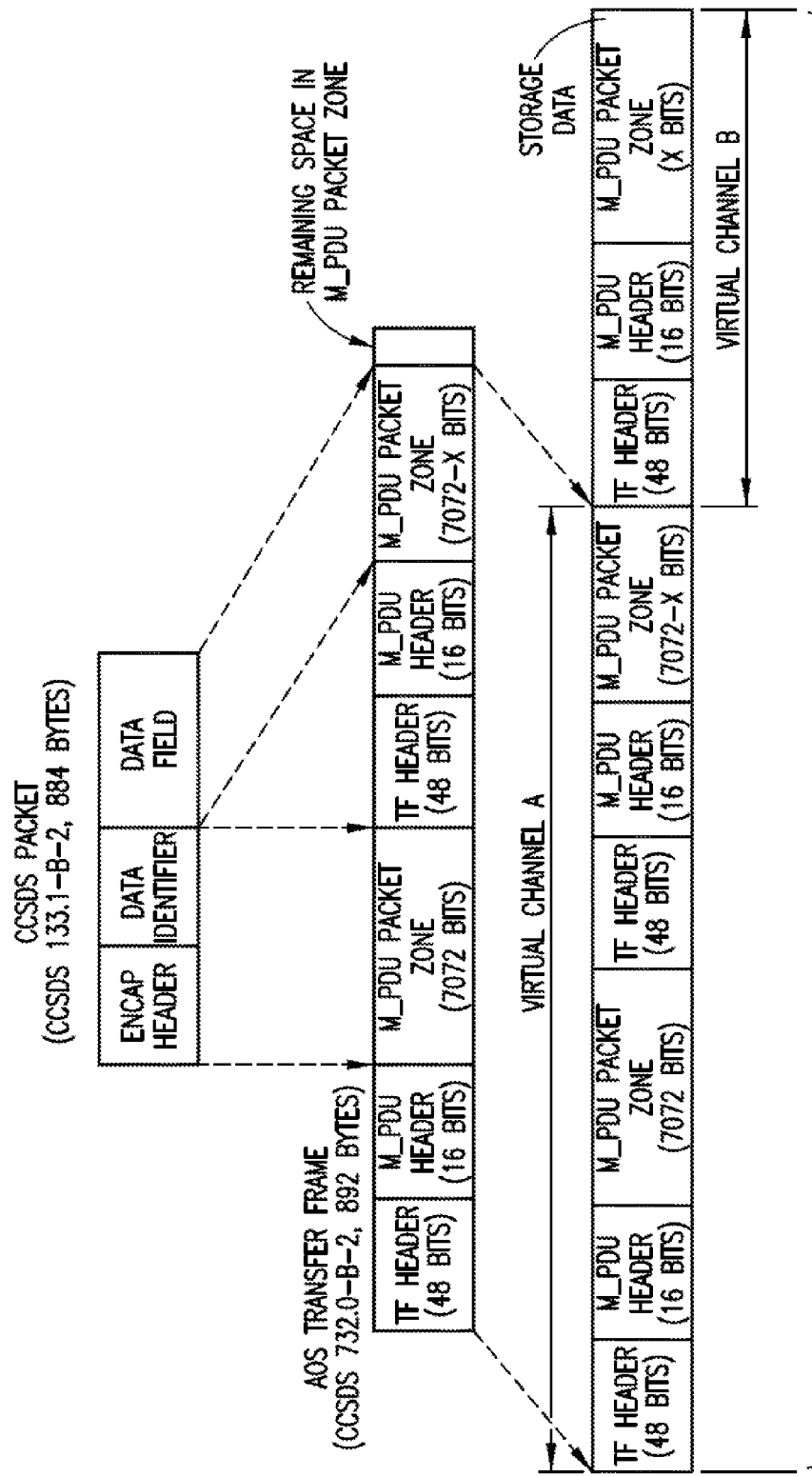
FIG. 3 is an exemplary data packet formation in accordance with aspects of the present disclosure.
Figure 4:
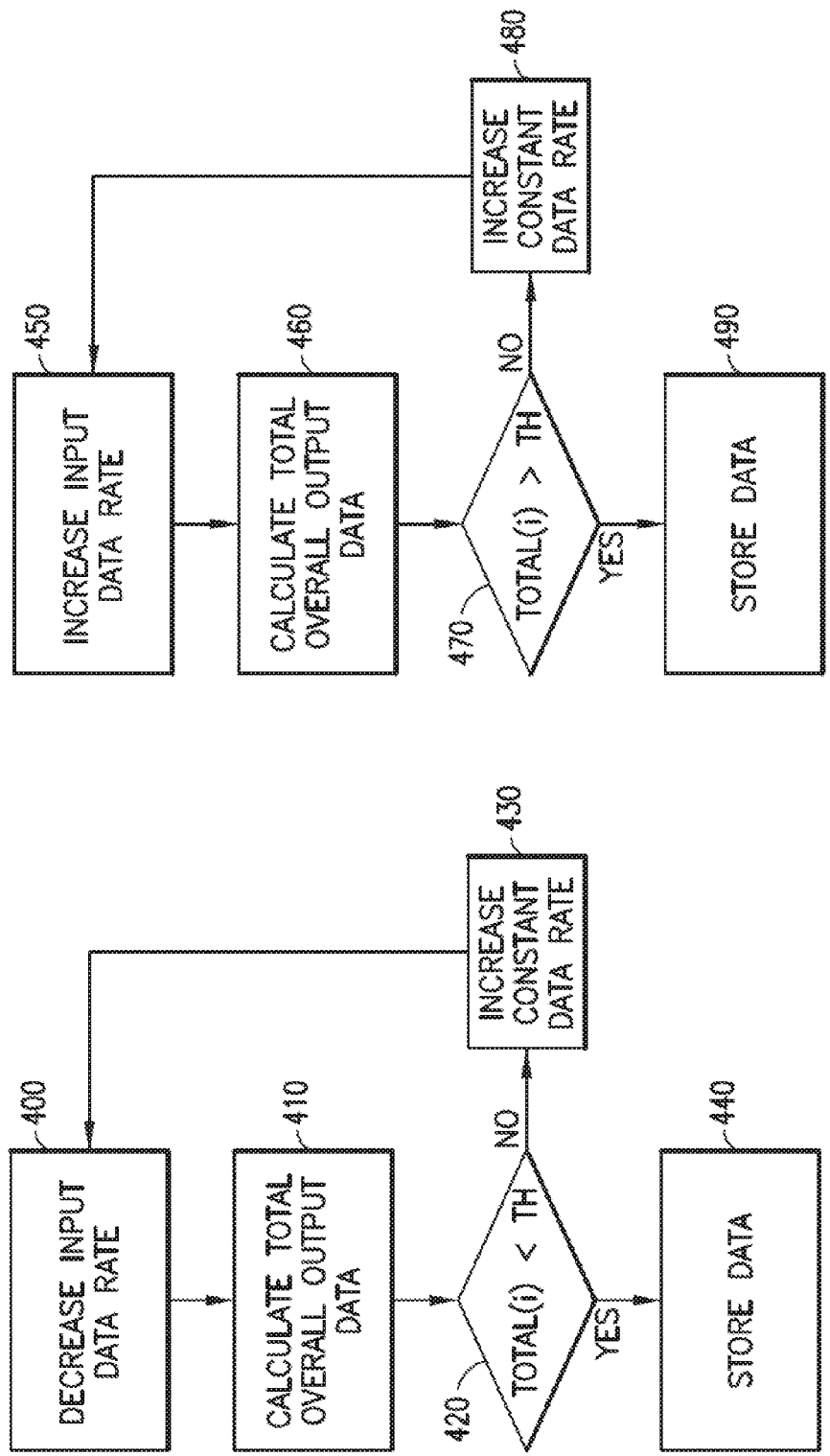
FIG. 4A is a flow diagram to determine an optimal data transfer rate, a maximum actual data to be transferred and data to be stored in accordance with aspects of the present disclosure.
FIG. 4B is a flow diagram to determine an optimal data transfer rate, a maximum actual data to be transferred and data to be stored in accordance with aspects of the present disclosure.

As described above, in conventional communication systems the transfer frame has a fixed size packet and the fill data is used at the end of the packet to fill space in the packet not being used by real time telemetry data. The M_PDU pointer is set to tell the receiver whether the transfer frame is the beginning of a new packet, a continuation of a packet, or an idle (e.g. fill) data of an encapsulation packet. The M-PDU pointer can also be used to indicate the ending of an encapsulated packet. The aspects of the present disclosure as will be described herein, replace the idle or fill data within a packet with telemetry data (e.g. actual payload data) from the storage buffer 110M when there is not enough real time telemetry data to maintain a communication link. FIG. 3 illustrates a CADU structure in accordance with the aspects of the present disclosure. In FIG. 3 the CCSDS packet is illustrated as having a header (e.g., ENCAP header), a data identifier and a data field. The AOS transfer frame created by the telemetry unit 110 includes one or more packets, only one CCSDS packet is illustrated for exemplary purposes. The payloads of CCSDS Packet may include data from a common data unit 111A-111C (e.g. the same virtual channel) or from different data units 111A-111C (e.g. different virtual channels). For exemplary purposes only, in this example, the payload or M_PDU packet zone has a fixed size of 7072 bits. In other aspects the M_PDU packet zone may have a fixed size that is greater than or less than about 7072 bits. In this example, CCSDS Packet includes a M_PDU packet zone corresponding to the Data Field of the CCSDS Packet where, for example, the M_PDU packet zone has less than 7072 bits (e.g. 7072 bits-X bits) of real time data. In a conventional communication system the remaining space (e.g. X bits) in the CCSDS Packet would be filled with fill or idle data however, in accordance with aspects of the present disclosure, the processor 110P of the telemetry unit 110 includes the unfilled M_PDU packet zone in the CCSDS Packet as M_PDU Packet Zone having 7072-x bits of real time data and then includes x bits of stored data from the storage buffer 110M in the CCSDS Packet as a M_PDU Packet Zone having x bits so that a full packet zone including the two M_PDU Packet zones is included in the CCSDS Packet. In one aspect, the real time data may be a first virtual channel (e.g. virtual channel A) while the stored data is a second virtual channel (e.g. virtual channel B). In other aspects, the real time data and the stored data may be part of a common virtual channel (e.g. virtual channel A includes both real time and stored data).

As described herein, the telemetry unit 110 receives data from the data units 111A-111C. Each of the data units 111A-111C has communication packets having a fixed size, such as for example, 7072 bits. As also described herein, where an amount of data in a packet from the data units 111A-111C is less than the fixed size (e.g. less than 7072 bits), the data from storage buffer 110M is used to fill the remaining space in the packet. In accordance with aspects of the present disclosure, once the number of packets is determined, the CCSDS overhead is added on top of the real time telemetry data, and the added storage data so as to not exceed a threshold data rate value TH. In accordance with aspects of the present disclosure, data rates from the data units 111A-111C are chosen so that the entire data rate after adding the CCSDS overhead is less than the threshold data rate value TH. For example, in accordance with the aspects of the present disclosure, the data rate of the data units 111A-111C can exceed or be less than a fixed downlink bandwidth transmitting rate of the communications platform 100 by adding the storage buffer 110M to the telemetry unit 110. As described herein, the storage buffer 110M stores data from the data units 111A-111C that is not mission critical data (e.g. not needed for flight control or mission decisions) and where the data stored in the storage buffer 110M is transmitted when the input data rate from the data units 111A-111C is lower than the threshold data rate value.

In one aspect, the data rate (e.g. an input data rate) from the data units 111A-111C exceeds the threshold data rate value TH. Here the total input rate exceeds the allowable data rate (e.g. the threshold data rate value TH) after adding the CCSDS overhead and a portion of the data is stored in the storage buffer to obtain an optimal data rate that does not exceed the threshold data rate value TH, noting that the optimal data is a data rate as close as possible (e.g. depending on an iteration step size as described herein) to or substantially equal to the threshold data rate value without exceeding the threshold data rate value. Referring to FIGS. 1, 2, 4A, 5, 6 and 7A an exemplary method is described where the exemplary method is implemented by and within the telemetry unit 110 for determining the optimal data rate and resulting storage data, given an original input data rate that exceeds the allowable data rate. In block 400 the input data rate (referred to as "Data") from the data unit(s) 111A-111C is iteratively decreased by a constant data rate "a" (e.g. the iteration step size) for forming what is referred to as Data_New as illustrated in the following equation:

$$\text{Data\_New}(i) = \text{Data} - a \quad [1]$$

The constant data rate "a" may have an initial value of 0 and increase in steps of 1 however, in other aspects the initial value of "a" may be any fractional or integer value and the step size may be any fractional or integer value. In one aspect, the initial value of the constant data rate a may depend on how close the values for the threshold data rate value TH and the total overall output data are. In one aspect, the processor 110P of the telemetry unit 110 includes a CCSDS function. In Block 410, the Data_New is imported to the CCSDS function to form the CCSDS packet where the CCSDS function adds overhead (referred to as "CCSDS_OH") corresponding to Data_New in the packet resulting in the total overall output data (referred to as "Total") where:

$$\text{Total}(i) = \text{Data\_New}(i) + \text{CCSDS\_OH} \quad [2]$$

As described herein, the overall data must be below the threshold data rate value TH. In Block 420 the iterative Total or aggregate is compared to the threshold data rate value TH where if the Total is below the threshold data rate value TH then the current value for Data_New is chosen by the processor 110P as the optimum data rate for transmission and the difference between Data (e.g. the initial value of real time data) and Data_New is stored in the storage buffer 110M as the storage data in Block 440 for later transmission as described herein, where $$\text{Storage Data} = \text{Data} - \text{Data\_New}(i) \quad [3]$$

If after the comparison the value of Data_New is greater than the threshold data rate value TH then in Block 430 the constant data rate a is increased by a predetermined amount M which in this example, is increased stepwise by a value of "i" where i=i+1 and the initial value of i is any predetermined fractional or integer value (e.g. such a 1 in this example). As such, the constant data rate a is increased according to:

$$a = a + M(i) \quad [4]$$

In one aspect, the value of the M may depend on how close the values for the threshold data rate value TH and the total overall output data are. The process flow repeats Blocks 400-430 until the current value of Data_New is less than the threshold data rate value TH.

Figure 5:
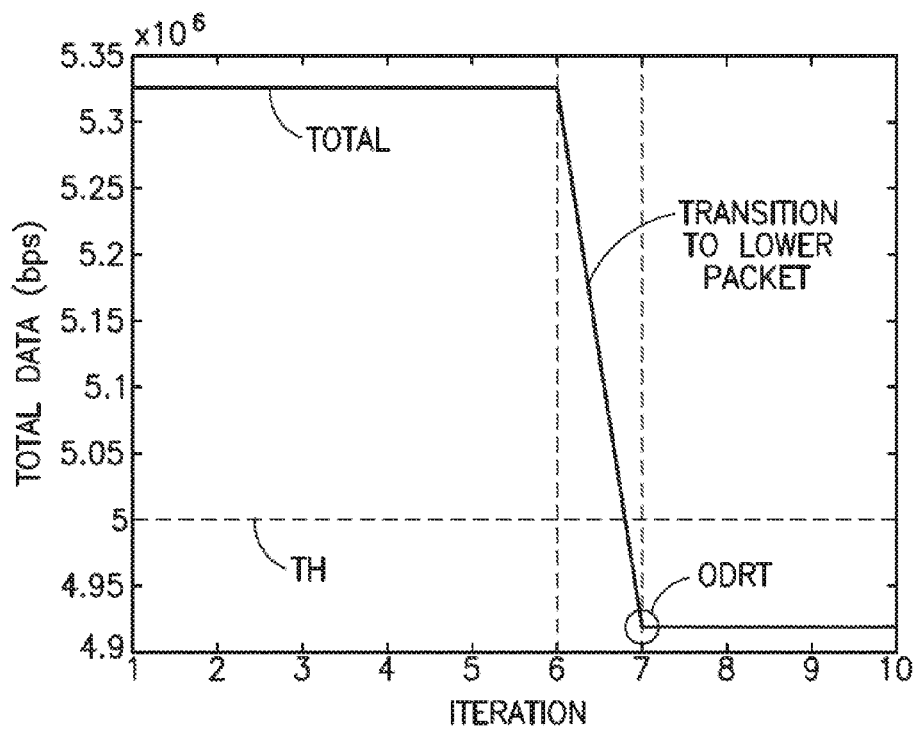
FIG. 5 is a graphical illustration of a transition to a lower packet according to the flow diagram of FIG. 4A.
Figure 6:
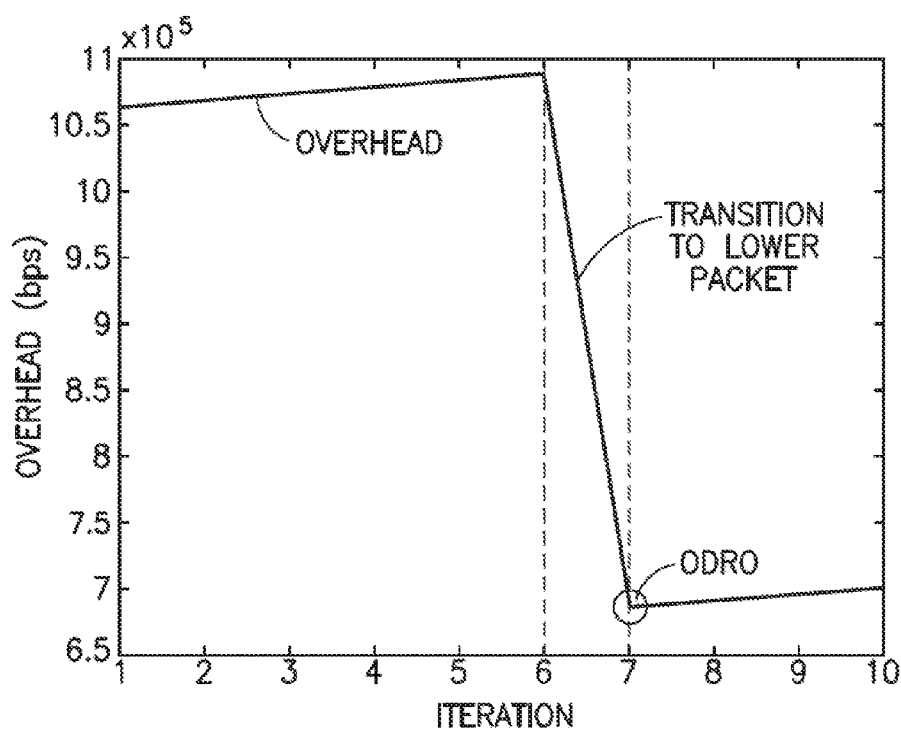
FIG. 6 is a graphical illustration of overall overhead according to the flow diagram of FIG. 4A.
Figure 7:
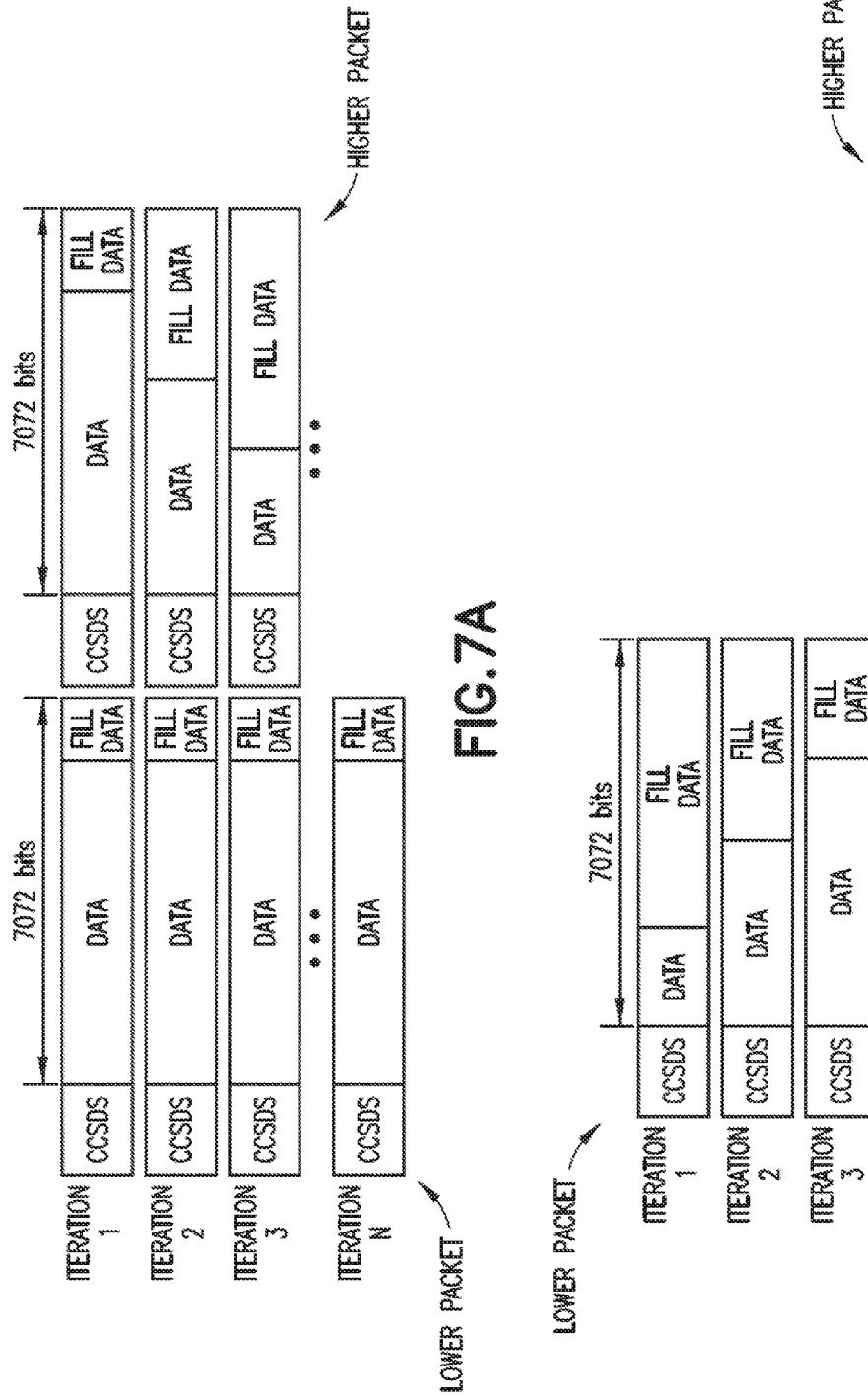
FIG. 7A is a graphical illustration of a transition to a lower packet according to the flow diagram of FIG. 4A.
FIG. 7B is a graphical illustration of a transition to a higher packet according to the flow diagram of FIG. 4B.

As an example of determining an amount of storage data, the real time data from one of the data units 111A-111B is used where the real time data has an exemplary data rate of about 4.3 Mbps. The processor 110P calculates the overhead for the real time data and the resulting total overall output data is, for example, about 5.3 Mbps which is above, for example, an exemplary threshold data rate value of 5 Mbps. In this example, the constant data rate is increased and the current real time data is reduced by the incremented constant data rate, which for example, may be a factor of about 5 Kbps for each iteration and will be repeated until the total overall output data is less than the exemplary threshold data rate value of 5 Mbps. The difference between the exemplary initial real time data rate of about 4.3 Mbps and the current real time data rate (e.g. Data_New) is stored in the storage buffer 110M. FIGS. 5 and 7A show that as data decreases, the total data stays above the exemplary threshold data rate value of 5 Mbps until the amount of real time data transitions from a higher packet to a lower packet, noting that the storage data inserted into the packet from storage buffer 111M is shown in the Figs. as "fill data" for exemplary purposes only. FIG. 6 illustrates the overhead for different iterations of the method of FIG. 4A. For example, FIG. 6 shows that as data decreases, the fill data increases and the overall overhead increases until the amount of data reaches the transition region where one packet is reduced (e.g. the amount of data transitions from the higher packet to the lower packet), noting that the transition from the higher packet to the lower packet in the example given is within for example, 20 msec, but the output plots shown in FIGS. 5 and 6 for each iteration are in 1 sec, which means that the output for 20 msec is multiplied by 50. In other aspects, the time period for the transition from the higher packet to the lower packet may be within any suitable time period greater than or lower than about 20 msec. As can be seen in FIGS. 5 and 6, the optimal data rate ODRT for the total data and the optimal data rate ODRO for the overhead are respectively illustrated as the end point of the transition to the lower packet at, for example the seventh iteration of the method described with respect to FIG. 4A.

In one aspect, the data rate (e.g. an input data rate) from the data units 111A-111C is less than the threshold data rate value TH. Here the total input rate is less than the allowable data rate (e.g. the threshold data rate value) after adding the CCSDS overhead and a portion of the data stored in the storage buffer is inserted into the packet so that the data rate is iteratively increased until the data rate exceeds the threshold data rate value TH, noting that the optimal data rate is, in this example, the input data rate of the iteration prior to the input data rate exceeding the threshold data rate value TH. Referring to FIGS. 1, 2, 4B, 7B, 8 and 9 an exemplary method implemented by and within the telemetry unit 110 for determining an optimal data rate and resulting storage data, given an original input data rate that is less than the allowable data rate. In block 450 the input data rate (referred to as "Data") is increase by a constant data rate "b" (e.g. the iteration step size) for form what is referred to as Data_New as illustrated in the following equation:

$$\text{Data\_New}(j) = \text{Data} + b \quad [5]$$

As described herein, the constant data rate "b" may have an initial value of 0 and increase in steps of 1 however, in other aspects the initial value of "b" may be any fractional or integer value and the step size may be any fractional or integer value. In one aspect, the initial value of the constant data rate b may depend on how close the values for the threshold data rate value TH and the total overall output data are. In one aspect, the processor 110P of the telemetry unit 110 includes the CCSDS function, as described herein. In one aspect, the values for the constant data rate a and the constant data rate b are substantially the same while in other aspects the values for the constant data rate a and the constant data rate b are different. In Block 460, the Data_New is imported to the CCSDS function to form the CCSDS packet where the CCSDS function adds overhead (referred to as "CCSDS_OH") corresponding to Data_New in the packet resulting in the total overall output data (referred to as "Total") where:

$$\text{Total}(j) = \text{Data\_New}(j) + \text{CCSDS\_OH} \quad [6]$$

As described herein, the overall data must be below the threshold data rate value. In Block 470 the iterative Total is compared to the threshold data rate value TH where if Total is above the threshold data rate value TH then the previous iterative value for Data_New is chosen by the processor 110P as the optimum data rate for transmission and the difference between the previous iterative value for Data_New and Data (e.g. the initial value of real time data) is stored in the storage buffer 110M as the storage data in Block 490 for later transmission as described herein, where $$\text{Storage Data}(j) = \text{storage data}(j-1) - (\text{Data\_New}(j-1) - \text{Data}) \quad [7]$$

If after the comparison the value of Data_New is less than the threshold data rate value TH then in Block 480 the constant data rate b is increased by a predetermined amount N which in this example, is increased stepwise by a value of "j" where j=j+1 and the initial value of j is any predetermined fractional or integer value (e.g. such a 1 in this example). As such, the constant data rate b is increased according to:

$$b = b + N(j) \quad [8]$$

In one aspect, the value of the N may depend on how close the values for the threshold data rate value TH and the total overall output data are. In one aspect the values of constant data rate a and the constant data rate b are substantially the same while in other aspects the value of constant data rate a is different than the value of the constant data rate b. In one aspect the values of i and j are substantially the same while in other aspects the values of i and j are different. In one aspect the values of predetermined amount M and the predetermined amount N are substantially the same while in other aspects the value of the predetermined amount M is different than the value of the predetermined amount N. The process flow repeats Blocks 450-480 until the current value of Data_New is greater than the threshold data rate value TH.

Figure 8:
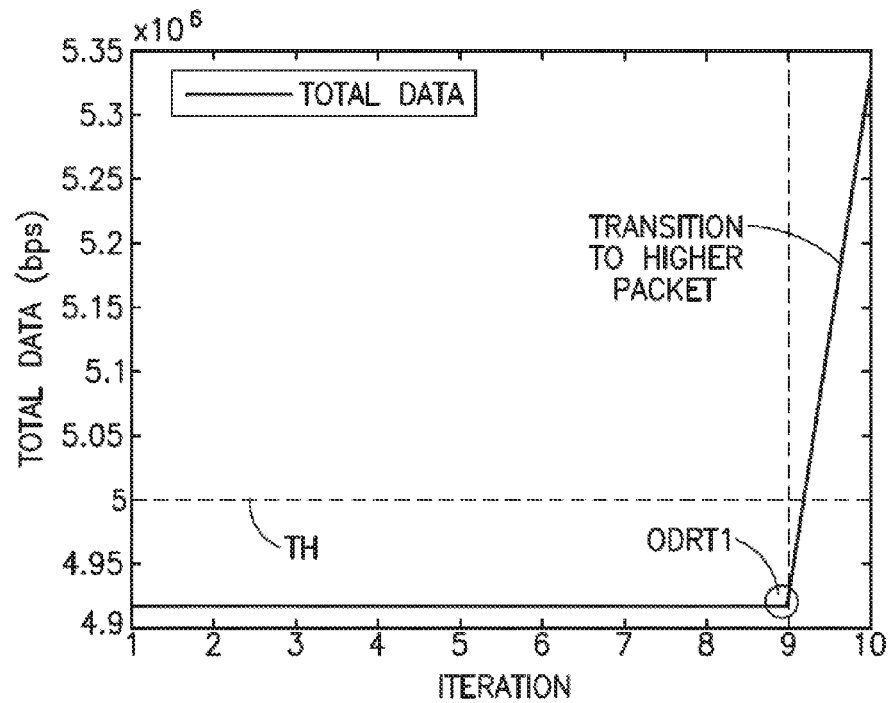
FIG. 8 is a graphical illustration of a transition to a higher packet according to the flow diagram of FIG. 4B.
Figure 9:
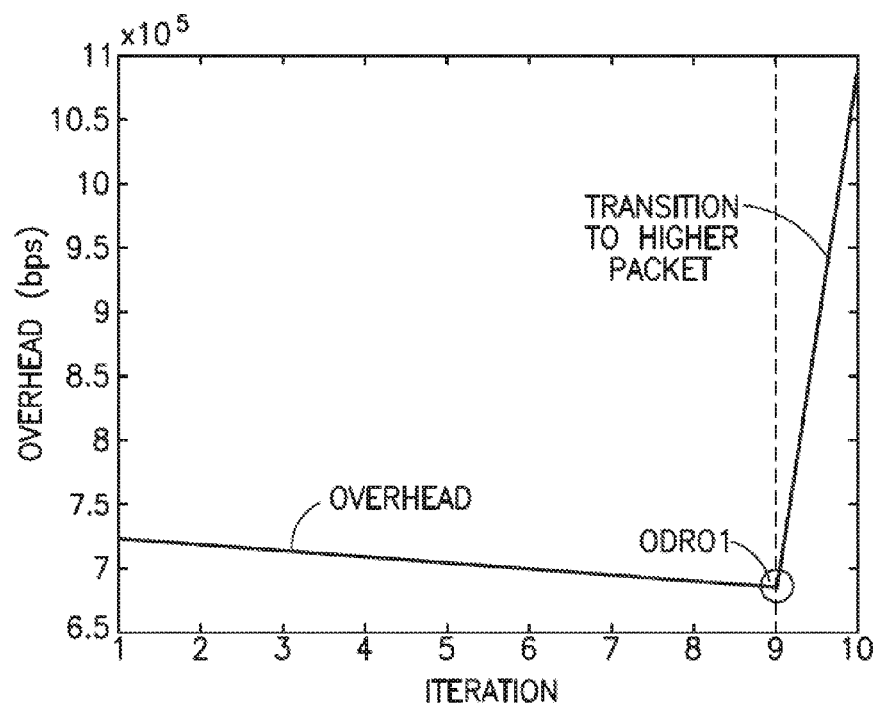
FIG. 9 is a graphical illustration of overall overhead according to the flow diagram of FIG. 4B.

As an example of determining an amount of storage data, the real time data from one of the data units 111A-111B is used where the real time data and the overhead has a total data rate of about 4.9 Mbps which is below, for example, the exemplary threshold data rate value of 5 Mbps. In this example, the constant data rate is increased and the current real time data is increased by the incremented constant data rate, which for example, may be a factor of 5 Kbps for each iteration and will be repeated until the total overall output data is greater than the exemplary threshold data rate value of 5 Mbps. The difference between the previous iterative value for Data_New and Data (e.g. the initial value of real time data) is stored in the storage buffer 110M as the storage data. FIGS. 7B and 8 show that as data increases, the total data stays below the exemplary threshold data rate value of 5 Mbps until the amount of real time data transitions from a lower packet to a higher packet, noting that the storage data inserted into the packet from storage buffer 110M is shown in the Figs. as "fill data" for exemplary purposes only. FIG. 9 illustrates the overhead for different iterations of the method of FIG. 4B. For example, FIG. 9 shows that as data increases, the fill data decreases and the overall overhead decreases until the amount of data reaches the transition region where one packet is filled (e.g. the amount of data transitions from the lower packet to the higher packet), noting that the transition from the lower packet to the higher packet in the example given is within for example, 20 msec, but the output plots shown in FIGS. 8 and 9 for each iteration are in 1 sec, which means that the output for 20 msec is multiplied by 50. In other aspects, the time period for the transition from the higher packet to the lower packet may be within any suitable time period greater than or lower than about 20 msec. As can be seen in FIGS. 8 and 9, the optimal data rate ODRT1 for the total data and the optimal data rate ODRO1 for the overhead are respectively illustrated as the start point of the transition to the higher packet at, for example the ninth iteration of the method described with respect to FIG. 4B.

Figure 10:
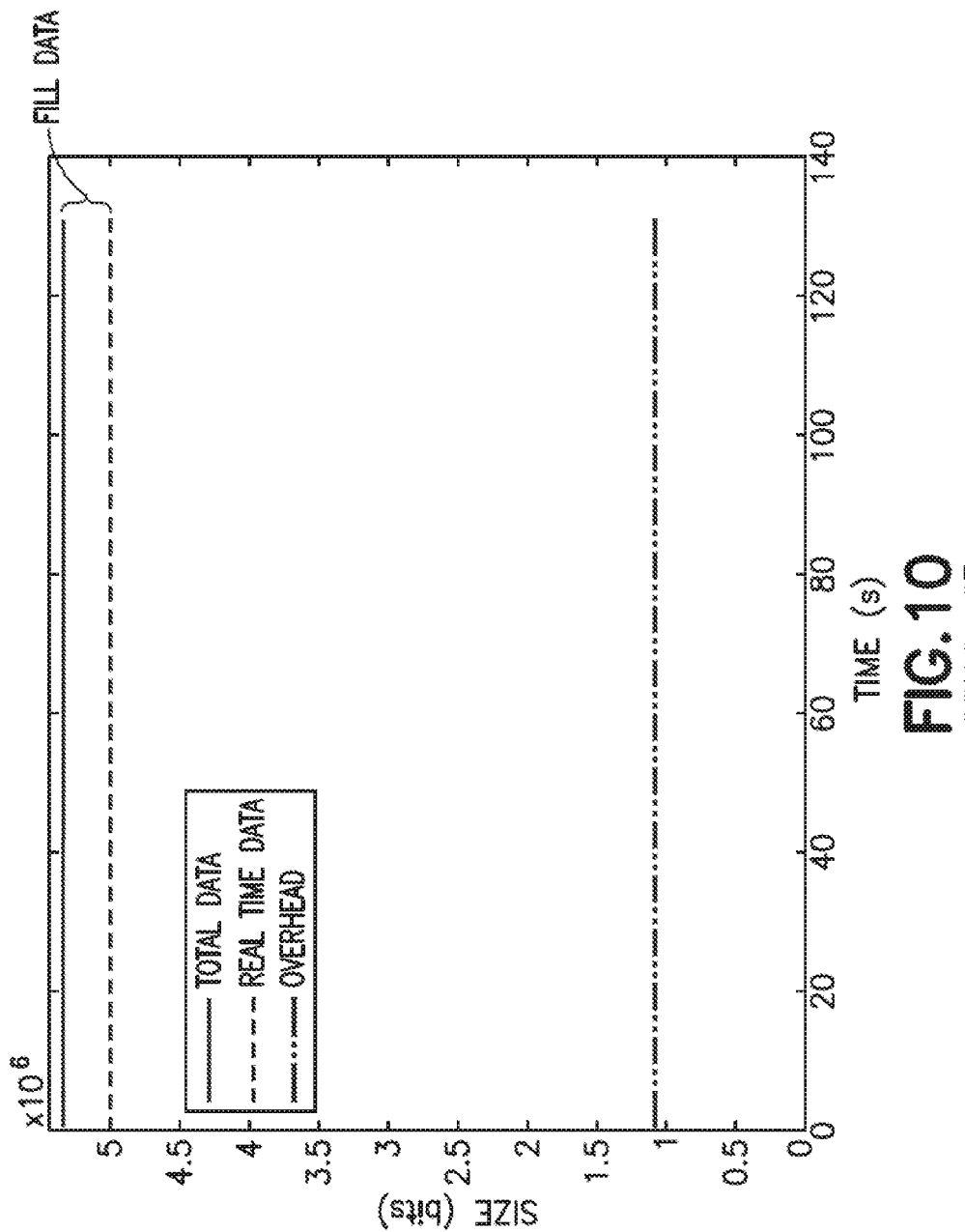
FIG. 10 is a graphical illustration of non-optimized data transfer in accordance with aspects of the present disclosure.
Figure 11:
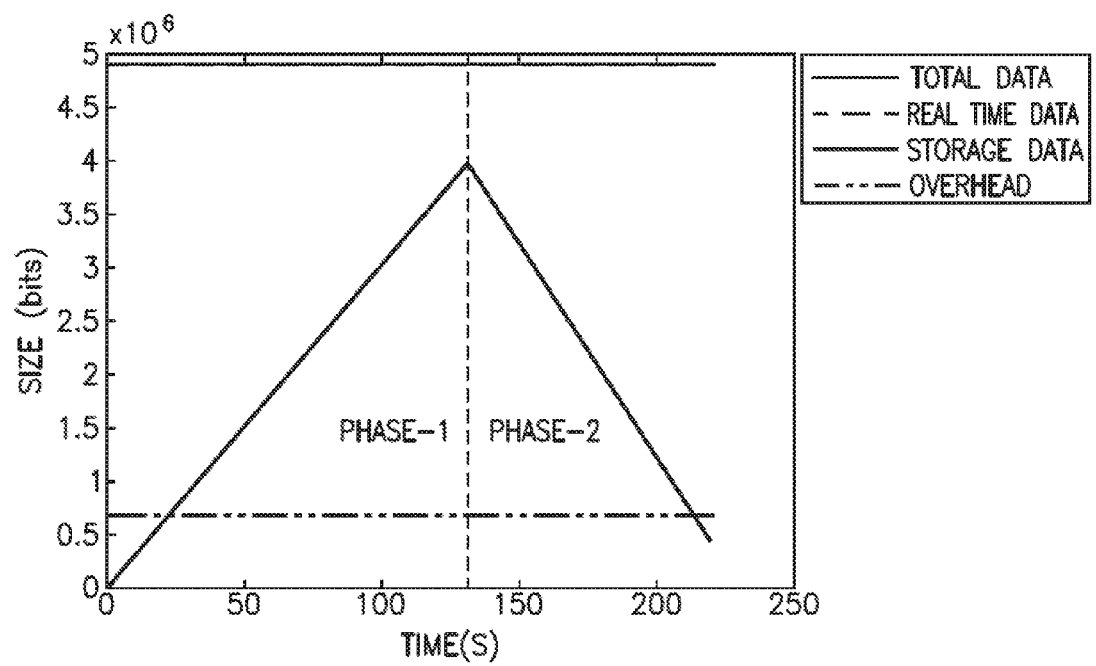
FIG. 11 is a graphical illustration of optimized data transfer in accordance with aspects of the present disclosure.
Figure 12:
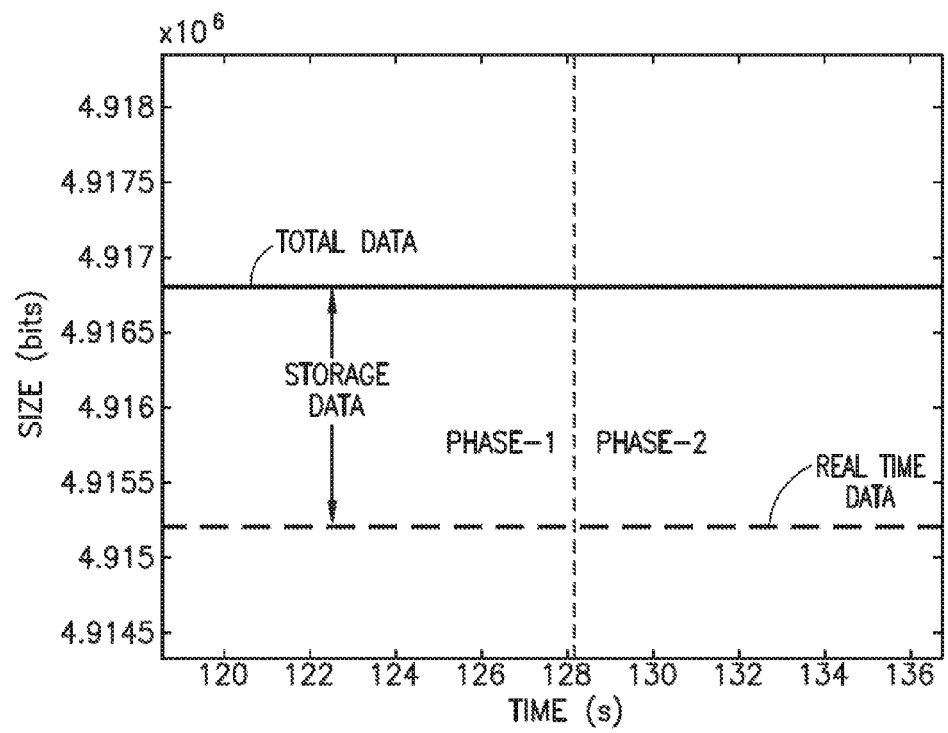
FIG. 12 is a graphical illustration of a portion of the graph in FIG. 11.

Referring to FIG. 10, an illustration of exemplary data for a conventional communication system from one data unit is illustrated. Here the data includes the total data, the overhead, the fill data and the real time data. In this example, the data rate exceeds the exemplary threshold data rate value TH of 5 Mbps where the fill data makes up about 0.5 Mbps of the total data which makes the conventional communication platform inefficient. In contrast, FIGS. 11 and 12 illustrate data plots according to the aspects of the present disclosure. In FIGS. 11 and 12 the plots are divided into, for example, two time phases, e.g. Phase 1 and Phase 2. In other aspects, there may be more or less than two time phases. In one aspect, the time phases may correspond to phases of a mission. Here, Phase 1 has a real time data rate that is higher than the exemplary threshold data rate value TH of 5 Mbps, and Phase 2 has a real time data rate that is lower than the exemplary threshold data rate value. As illustrated in FIG. 11, even though the real time data transfer rate exceeds the threshold data rate value TH data is removed from the real time data and placed in the storage buffer 110M in the manner described herein so that in phase 1 the total data rate is below the threshold data rate value TH and the fill data (in accordance with aspects of the present disclosure the fill data is data from the storage buffer 110M) in the total data is minimized as illustrated in FIG. 11 where the storage data in the total data makes up about 0.002 Mbps of the total data. As illustrated in FIG. 11, the storage data increases during Phase 1 to maintain the total data rate below the threshold data rate value TH. In Phase 2, the real time data rate is below the threshold data rate value TH however, data from storage is added to the transmission as described herein to minimize the fill data (e.g. the storage data in the storage buffer 110M decreases). Contrary to conventional communication systems, the aspects of the present disclosure take advantage of the storage data in the storage buffer 110M to minimize the overhead in the data transmission.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Figure 13:
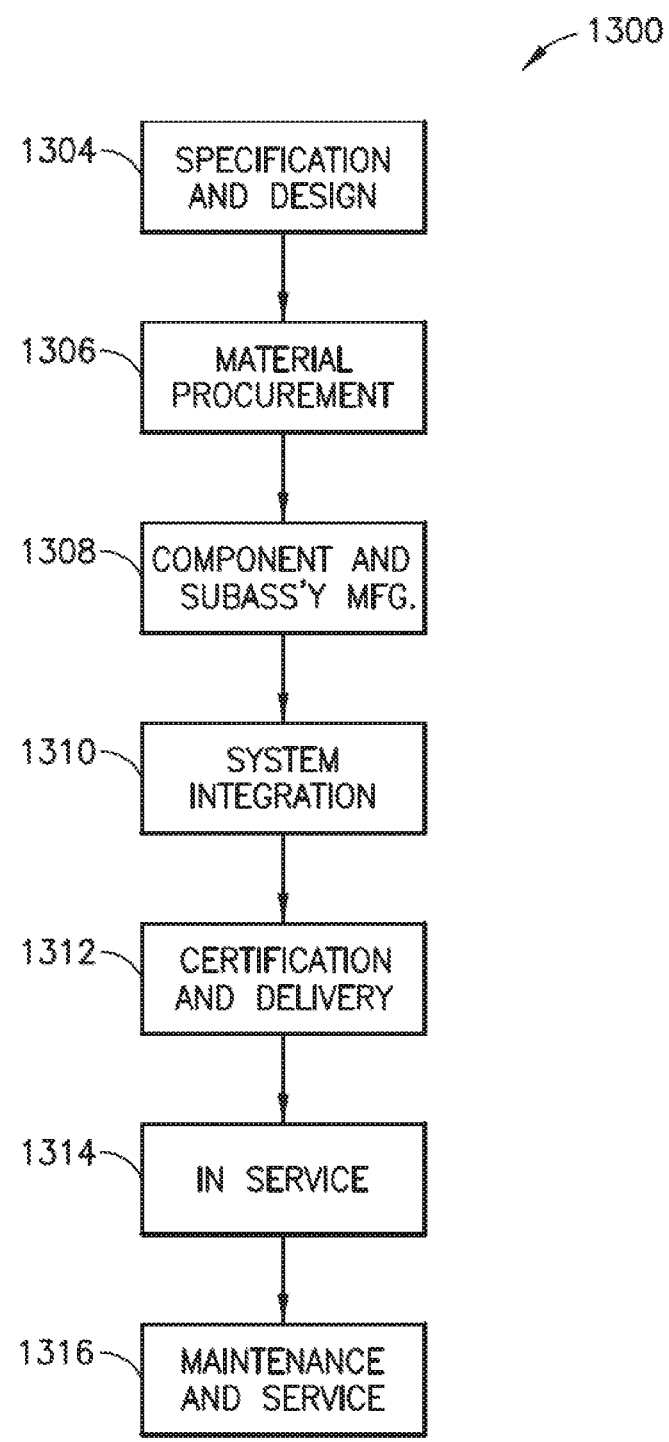
FIG. 13 is a flow diagram of aircraft production and service methodology.
Figure 14:
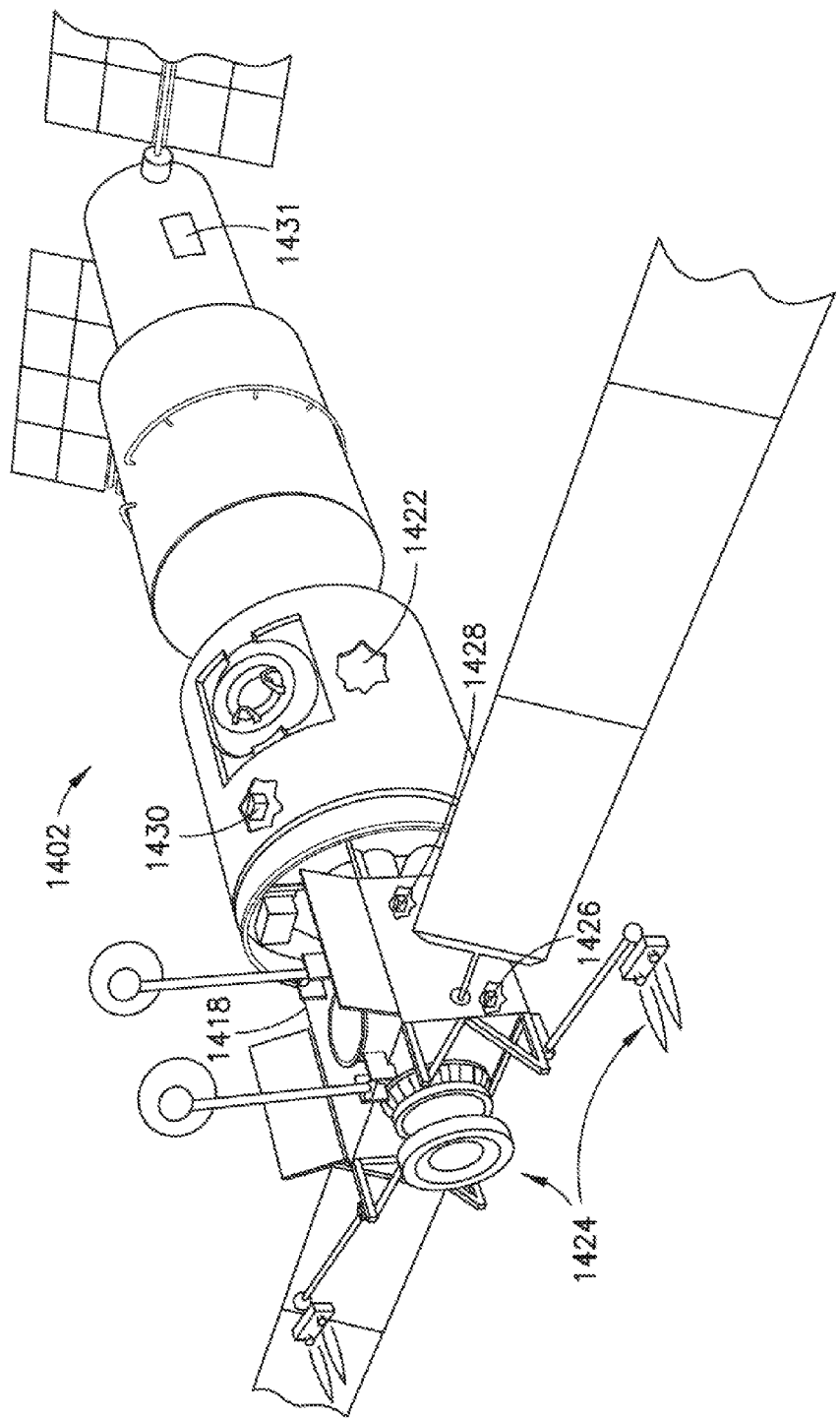
FIG. 14 is a schematic illustration of a spacecraft including distributed vehicle systems.

Examples of the disclosure may be described in the context of a spacecraft manufacturing and service method 1300 as shown in FIG. 13 and a spacecraft 1402 as shown in FIG. 14. During pre-production, illustrative method 1300 may include specification and design 1304 of the spacecraft 1402 and material procurement 1306. During production, component and subassembly manufacturing 1308 and system integration 1310 of the spacecraft 1402 take place. Thereafter, the spacecraft 1402 may go through certification and delivery 1312 to be placed in service 1314. While in service by a customer, the spacecraft 1402 is scheduled for routine maintenance and service 1316 (which may also include modification, reconfiguration, refurbishment, and so on).

Each of the processes of the illustrative method 1300 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be a communications company, aerospace company, leasing company, military entity, service organization, and so on.

As shown in FIG. 14, the spacecraft 1402 produced by the illustrative method 1300 may include an airframe 1418 with a plurality of high-level systems and an interior 1422. Examples of high-level systems, which are distributed throughout the spacecraft, include one or more of a propulsion system 1424, an electrical power system 1426, a hydraulic system 1428, and an environmental system 1430 and the satellite communications relay system 1431. Any number of other systems may be included. Although an aerospace example is shown, the principles of the invention may be applied to other industries, such any industry using data packet communication transmissions.

The system and methods shown or described herein may be employed during any one or more of the stages of the manufacturing and service method 1300. For example, components or subassemblies corresponding to component and subassembly manufacturing 1308 may be fabricated or manufactured in a manner similar to components or subassemblies produced while the spacecraft 1402 is in service. Also, one or more aspects of the system, method, or combination thereof may be utilized during the production states 1308 and 1310, for example, by substantially expediting assembly of or reducing the cost of a spacecraft 1402. Similarly, one or more aspects of the system or method realizations, or a combination thereof may be utilized, for example and without limitation, while the spacecraft 1402 is in service, e.g., operation, maintenance and service 1316.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In accordance with one or more aspects of the present disclosure a method for transmitting data includes: receiving data from one or more data units; determining a total data rate based on data obtained from the one or more data units; determining an optimum data rate for packet transmission based on minimizing overhead data included in the packet transmission where, when the total data rate exceeds a predetermined threshold, a first portion of data is automatically removed from the data obtained from the one or more data units for placement in a data storage buffer and a second portion of the data obtained from the one or more data units remains in the packet transmission such that the total data rate is decreased; and transmitting the second portion of the data obtained from the one or more data units at the optimum data rate.

In accordance with one or more aspects of the present disclosure, when the total data rate is below the predetermined threshold the method further includes retrieving data from the storage buffer for inclusion in the packet transmission such that the total data rate is increased.

In accordance with one or more aspects of the present disclosure the data retrieved from storage is transmitted in a first virtual channel while the data obtained from the one or more data units is transmitted in a second virtual channel that is different than the first virtual channel.

In accordance with one or more aspects of the present disclosure the data retrieved from storage and the data obtained from the one or more data units are transmitted in a common virtual channel.

In accordance with one or more aspects of the present disclosure the data obtained from the one or more data units is real time data.

In accordance with one or more aspects of the present disclosure the first portion of data includes data that is free from flight control data and free from data that affects mission decisions.

In accordance with one or more aspects of the present disclosure a communication apparatus includes: one or more data units; and a telemetry unit connected to the one or more data units, the telemetry unit including a processor and a storage buffer, the processor being configured to determine a total data rate based on data obtained from the one or more data units, determine an optimum data rate for packet transmission based on minimizing overhead data included in the packet transmission where, when the total data rate exceeds a predetermined threshold, a first portion of data is automatically removed, by the processor, from the data obtained from the one or more data units for placement in the storage buffer and a second portion of the data obtained from the one or more data units remains in the packet transmission such that the total data rate is decreased; and transmit the second portion of the data obtained from the one or more data units at the optimum data rate.

In accordance with one or more aspects of the present disclosure, the processor is configured to, when the total data rate is below the predetermined threshold, retrieve data from the storage buffer for inclusion in the packet transmission such that the total data rate is increased.

In accordance with one or more aspects of the present disclosure the processor is configured to transmit the data retrieved from storage in a first virtual channel and transmit the data obtained from the one or more data units a second virtual channel that is different than the first virtual channel.

In accordance with one or more aspects of the present disclosure the processor is configured to transmit the data retrieved from storage and the data obtained from the one or more data units in a common virtual channel.

In accordance with one or more aspects of the present disclosure the data obtained from the one or more data units is real time data.

In accordance with one or more aspects of the present disclosure the first portion of data includes data that is free from flight control data and free from data that affects mission decisions.

In accordance with one or more aspects of the present disclosure, further including a controller communicably coupled to the telemetry unit, the controller configured to communicate the packet transmission to a transmit unit for inclusion in a downlink signal.

In accordance with one or more aspects of the present disclosure a telemetry system includes: a storage buffer, one or more data units, and a processor connected to the storage buffer and the one or more data units, the processor being configured to determine a total data rate based on data obtained from the one or more data units, determine an optimum data rate for packet transmission, including flight control data and mission decision data, based on minimizing overhead data included in the packet transmission where, when the total data rate exceeds a predetermined threshold, a first portion of data is automatically removed, by the processor, from the data obtained from the one or more data units for placement in the storage buffer and a second portion of the data that includes the flight control data and the mission control data, obtained from the one or more data units, remains in the packet transmission such that the total data rate is decreased, and transmit the second portion of the data obtained from the one or more data units at the optimum data rate.

In accordance with one or more aspects of the present disclosure the processor is configured to, when the total data rate is below the predetermined threshold, retrieve data from the storage buffer for inclusion in the packet transmission such that the total data rate is increased.

In accordance with one or more aspects of the present disclosure the processor is configured to transmit the data retrieved from the storage buffer in a first virtual channel and transmit the data obtained from the one or more data units a second virtual channel that is different than the first virtual channel.

In accordance with one or more aspects of the present disclosure the processor is configured to transmit the data retrieved from the storage buffer and the data obtained from the one or more data units in a common virtual channel.

In accordance with one or more aspects of the present disclosure the data obtained from the one or more data units is real time data.

In accordance with one or more aspects of the present disclosure the first portion of data includes data that is free from flight control data and free from data that affects mission decisions.

In accordance with one or more aspects of the present disclosure, further including a controller communicably coupled to the processor, the controller configured to communicate the packet transmission to a transmit unit for inclusion in a downlink signal.

What is claimed is:

1. A method for transmitting data, the method comprising:
   receiving data from one or more data units;
   determining a total data rate based on data obtained from the one or more data units;
   determining an optimum data rate for packet transmission based on minimizing overhead data included in the packet transmission where, when the total data rate exceeds a predetermined threshold, a first portion of data is automatically removed from the data obtained from the one or more data units for placement in a data storage buffer and a second portion of the data obtained from the one or more data units remains in the packet transmission such that the total data rate is decreased; and
   transmitting the second portion of the data obtained from the one or more data units at the optimum data rate.

2. The method of claim 1 wherein when the total data rate is below the predetermined threshold, the method further comprises retrieving data from the storage buffer for inclusion in the packet transmission such that the total data rate is increased.

3. The method of claim 2, wherein the data retrieved from storage is transmitted in a first virtual channel while the data obtained from the one or more data units is transmitted in a second virtual channel that is different than the first virtual channel.

4. The method of claim 2, wherein the data retrieved from storage and the data obtained from the one or more data units are transmitted in a common virtual channel.

5. The method of claim 1, wherein the data obtained from the one or more data units is real time data.

6. The method of claim 1, wherein the first portion of data includes data that is free from flight control data and free from data that affects mission decisions.

7. A communication apparatus comprising:
   one or more data units; and
   a telemetry unit connected to the one or more data units, the telemetry unit including a processor and a storage buffer, the processor being configured to
   determine a total data rate based on data obtained from the one or more data units,
   determine an optimum data rate for packet transmission based on minimizing overhead data included in the packet transmission where, when the total data rate exceeds a predetermined threshold, a first portion of data is automatically removed, by the processor, from the data obtained from the one or more data units for placement in the storage buffer and a second portion of the data obtained from the one or more data units remains in the packet transmission such that the total data rate is decreased; and transmit the second portion of the data obtained from the one or more data units at the optimum data rate.

8. The communication apparatus of claim 7, wherein the processor is configured to, when the total data rate is below the predetermined threshold, retrieve data from the storage buffer for inclusion in the packet transmission such that the total data rate is increased.

9. The communication apparatus of claim 8, wherein the processor is configured to transmit the data retrieved from storage in a first virtual channel and transmit the data obtained from the one or more data units a second virtual channel that is different than the first virtual channel.

10. The communication apparatus of claim 8, wherein the processor is configured to transmit the data retrieved from storage and the data obtained from the one or more data units in a common virtual channel.

11. The communication apparatus of claim 7, wherein the data obtained from the one or more data units is real time data.

12. The communication apparatus of claim 7, wherein the first portion of data includes data that is free from flight control data and free from data that affects mission decisions.

13. The communication apparatus of claim 7, further comprising a controller communicably coupled to the telemetry unit, the controller configured to communicate the packet transmission to a transmit unit for inclusion in a downlink signal.

14. A telemetry system comprising:
a storage buffer;
one or more data units; and
a processor connected to the storage buffer and the one or more data units, the processor being configured to
determine a total data rate based on data obtained from the one or more data units,
determine an optimum data rate for packet transmission, including flight control data and mission decision data, based on minimizing overhead data included in the packet transmission where, when the total data rate exceeds a predetermined threshold, a first portion of data is automatically removed, by the processor, from the data obtained from the one or more data units for placement in the storage buffer and a second portion of the data that includes the flight control data and the mission control data, obtained from the one or more data units, remains in the packet transmission such that the total data rate is decreased, and
transmit the second portion of the data obtained from the one or more data units at the optimum data rate.

15. The telemetry system of claim 14, wherein the processor is configured to, when the total data rate is below the predetermined threshold, retrieve data from the storage buffer for inclusion in the packet transmission such that the total data rate is increased.

16. The telemetry system of claim 15, wherein the processor is configured to transmit the data retrieved from the storage buffer in a first virtual channel and transmit the data obtained from the one or more data units a second virtual channel that is different than the first virtual channel.

17. The telemetry system of claim 15, wherein the processor is configured to transmit the data retrieved from the storage buffer and the data obtained from the one or more data units in a common virtual channel.

18. The telemetry system of claim 14, wherein the data obtained from the one or more data units is real time data.

19. The telemetry system of claim 14, wherein the first portion of data includes data that is free from flight control data and free from data that affects mission decisions.

20. The telemetry system of claim 14, further comprising a controller communicably coupled to the processor, the controller configured to communicate the packet transmission to a transmit unit for inclusion in a downlink signal.

* * * * *